(12) United States Patent
Wang et al.

(10) Patent No.: US 9,058,920 B2
(45) Date of Patent: Jun. 16, 2015

(54) RTV ANTI-CONTAMINATION FLASHOVER COATING MATERIAL AND PRODUCTION PROCESS THEREOF

(71) Applicants: Shanxi Jincheng Power Supply Company, Jincheng, Shanxi Province (CN); Taiyuan Zhongtianxing Electric Power Technology Co. Ltd., Taiyuan, Shanxi Province (CN); Wuhan University, Wuhan, Hubei Province (CN); State Grid Corporation of China, Beijing (CN)

(72) Inventors: Shengming Wang, Jincheng (CN); Ronghua Huang, Wuhan (CN); Dong Zhang, Jingheng (CN); Xiaohong Yan, Jincheng (CN); Xinliang Kang, Jincheng (CN); Guangxu Jiao, Jincheng (CN); Minying Yu, Taiyuan (CN); Xinbao Li, Jincheng (CN); Wei Xiu, Yingze District Taiyuan (CN); Jing Liang, Jincheng (CN); Jianguo Ma, Jincheng (CN); Leilei Chang, Jincheng (CN)

(73) Assignees: Shanxi Jincheng Power Supply Company, Jincheng, Shanxi Province (CN); Taiyuan Zhongtianxing Electric Power Technology Co. Ltd., Taiyuan, Shanxi Province (CN); Wuhan University, Wuhan, Hubei Province (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 14/021,675

(22) Filed: Sep. 9, 2013

(65) Prior Publication Data

US 2014/0011952 A1   Jan. 9, 2014

Related U.S. Application Data

(63) Continuation of application No. PCT/CN2012/078286, filed on Jul. 6, 2012.

(30) Foreign Application Priority Data

Aug. 19, 2011   (CN) .......................... 2011 1 0240257

(51) Int. Cl.

| | |
|---|---|
| *H01B 3/00* | (2006.01) |
| *H01B 3/46* | (2006.01) |
| *C08K 5/5415* | (2006.01) |
| *C09D 7/12* | (2006.01) |
| *C08K 5/06* | (2006.01) |

(Continued)

(52) U.S. Cl.
CPC ........ *H01B 3/465* (2013.01); *C08K 2003/2265* (2013.01); *C08K 5/5415* (2013.01); *C09D 7/1216* (2013.01); *C08K 5/06* (2013.01); *C09D 183/04* (2013.01); *C08G 77/045* (2013.01); *C08G 77/24* (2013.01); *C09D 7/1233* (2013.01); *C09D 5/00* (2013.01); *C09D 7/125* (2013.01)

(58) Field of Classification Search
None
See application file for complete search history.

(56) References Cited

U.S. PATENT DOCUMENTS

| 4,781,988 A | 11/1988 | Rusek et al. | .................. 428/450 |
| 5,326,804 A * | 7/1994 | Mistry et al. | .................. 524/188 |

(Continued)

FOREIGN PATENT DOCUMENTS

| CN | 101597463 | 12/2009 | ........... C09D 183/06 |
| CN | 101717607 | 6/2010 | ........... C09D 183/06 |

(Continued)

OTHER PUBLICATIONS

Abstract for CN102174280 (Sep. 2011).*

(Continued)

*Primary Examiner* — Marc Zimmer
(74) *Attorney, Agent, or Firm* — Sunstein Kann Murphy & Timbers LLP

(57) ABSTRACT

An RTV anti-pollution flashover coating, and preparation method, includes components of the following weight parts: polydimethylsiloxane 100 parts, a reinforcing filler 4 to 10 parts, a catalyst 0.1 to 1 part, a crosslinking agent 1 to 5 parts, a hydrophobic agent 3 to 6 parts, a pigment 1 to 2 parts, decabromodiphenyl ether 1 to 2 parts, and toluene 30 to 40 parts. The hydrophobic agent is a mixture of a substance having a structure represented by Formula I and any one or more of a low-molecular weight silicone oil, dihydroxydiphenyl silane, fluorine-containing silicone oil and white oil. In Formula I, R is any one of acetoxy $CH_3COO—$, methoxy $CH_3O—$, ketoximo $MeEtCNO—$, an amide group $AcMeN—$, amino $C_6H_{11}NH—$ and acetonyl $H_2C=CMeO$; $R^1—Si$ is a polysiloxane group or a fluorine-containing siloxane group, and has a structural formula represented by Formula II, where $n=1$ to 4, and $R_2$ is $CH_3—$ or $CF_3—$

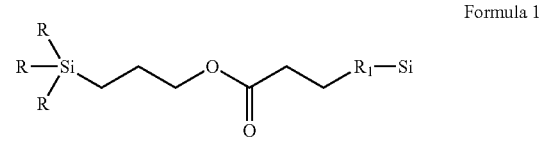

7 Claims, No Drawings

(51) Int. Cl.
  *C09D 183/04* (2006.01)
  *C09D 5/00* (2006.01)
  *C08K 3/22* (2006.01)
  *C08G 77/04* (2006.01)
  *C08G 77/24* (2006.01)

(56) References Cited

U.S. PATENT DOCUMENTS 5,372,854 A * 12/1994 Kinoshita et al. ............ 427/387
2007/0213455 A1 * 9/2007 Amarasekera et al. ....... 524/588

FOREIGN PATENT DOCUMENTS

| CN | 101787244 | 7/2010 | ........... C09D 183/06 |
| CN | 101870847 | 10/2010 | ........... C09D 183/06 |
| CN | 102174280 | 9/2011 | .............. C09D 7/12 |
| CN | 102321434 | 1/2012 | ........... C09D 183/04 |
| DE | 3002867 | 7/1981 | .............. C08L 83/04 |
| EP | 1 275 705 A1 | 1/2003 | ........... C09D 183/04 |
| TW | 528785 | 4/2003 | ........... C09D 183/06 |

OTHER PUBLICATIONS

Machine-generated translation of CN102174280 into English (no date).*
Abstract for TW 528785 (Apr. 2003).*
Abstract for DE 3002867 (Jul. 1981).*
Shanxi Electric Power, Chinese Search Report and Official Action; No. 4 (Ser. 167) Shanxi Electric Power, 9 pages, Aug. 2011 (Abstract in English) https://vpn.hw.sipo/proxy*11146855/kns55/brief/result.aspx.
Lui Xiaoqiang, Grant Document for the Prior Chinese Patent Application; CN102321434; 13 pages, Feb. 12, 2014 (Abstract in English).
The Intellectual Property Office of China, First Official Action and its English Translation for the Prior Chinese Patent Application; CN 2012100901297040; 12 pages, Oct. 12, 2012.
State Intellectual Property Office of China, Chinese Search Report and English Translation for the Prior Chinese Patent Application; CN 201110240257.0; 4 pages, Aug. 19, 2011.
Intellectual Searching Authority, International Search Report and Written Opinion; PCT/CN2012/078286, 6 pages, Oct. 4, 2012.

* cited by examiner

RTV ANTI-CONTAMINATION FLASHOVER COATING MATERIAL AND PRODUCTION PROCESS THEREOF

CROSS-REFERENCE TO RELATED APPLICATIONS

The present application is a continuation of International Application No. PCT/CN2012/078286 filed on Jul. 6, 2012, which claims the benefit of Chinese Application No. 201110240257.0 filed on Aug. 19, 2011, the disclosures of which are hereby incorporated by reference in their entirety.

FIELD OF THE INVENTION

The present invention relates to an RTV anti-contamination flashover coating material and the production process thereof, belonging to the technical field of coating materials for electric transmission and transformation equipments of electric power systems.

BACKGROUND OF THE INVENTION

During long-term use, an electric transformation equipment would have its surface covered with a large quantity of solid particles such as dust, thereby providing the surface of the electric transformation equipment with certain electrical conductivity and thus causing electric leakage during use, which is a waste of resources and brings about some potential safety issues. In order to solve such a problem, an RTV anti-contamination flashover coating material is often coated on the surface of the electric transformation equipment, in which the coating material endows the surface of the electric transformation equipment with strong hydrophobicity to enable the surface to retain hydrophobicity even if it is covered with solid particles. Therefore, the leakage current from the surface is prevented and the flashover voltage is increased.

Hydrophobic agents typically used in RTV anti-contamination flashover coating materials include low-molecular-weight silicone oils (Mw=300-500), dihydroxy(diphenyl)silane, low-molecular-weight fluorine-containing silicone oils, 3# white oil, and the like. These hydrophobic agents are added during the kneading of the coating materials, and are present in the RTV coating layer by means of physical embedding during vulcanization. During use, the hydrophobic agent migrates to the surface by diffusion driven by a concentration difference, has a release rate related to its diffusion coefficient, diffusion area and the like, and is consumed at a high rate. Therefore, increasing the concentration of the hydrophobic agent is a method often used to prolong the service life of an RTV anti-contamination flashover coating material. It is reported, however, that the life of an RTV anti-contamination flashover coating material is nearly not affected by the content of the hydrophobic agent that has been increased above a certain level alone. Therefore, there is a need for other methods of effectively decreasing the release rate of hydrophobic agents.

SUMMARY OF THE INVENTION

The present invention aims to provide an RTV anti-contamination flashover coating material with a prolonged service life, so as to solve the problem that RTV anti-contamination flashover coating materials have a short service life due to fast release of hydrophobic agents therefrom which requires the coating process to be frequently repeated.

The present invention further aims to provide a production process for such an RTV anti-contamination flashover coating material.

For the above mentioned objects, the present invention provides an RTV anti-contamination flashover coating material, which comprises the following components in parts by weight:

100 parts of polydimethylsiloxane, 4-10 parts of reinforcing filler, 0.1-1 parts of catalyst, 1-5 parts of crosslinking agent, 3-6 parts of hydrophobic agent, 1-2 parts of pigment, 1-2 parts of decabromodiphenyl ether, and 30-40 parts of toluene;

wherein, the hydrophobic agent is a mixture of (i) a substance having a structure shown in Formula 1, and (ii) one or more of a low-molecular-weight silicone oil, dihydroxy(diphenyl)silane, a fluorine-containing silicone oil, and white oil:

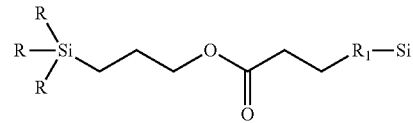

Formula 1 wherein, R is any one of acetoxy $CH_3COO-$, methoxy $CH_3O-$, a ketoximino group $MeEtCNO-$, an amide group $AcMeN-$, an amino group $C_6H_{11}NH-$, and an acetone group $H_2C=CMeO-$;

$R^1-Si$ is a polysiloxane group or a fluorine-containing siloxane group, and has a structure shown in Formula 2:

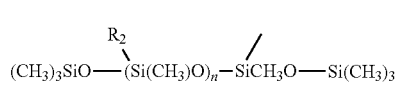

Formula 2 wherein, $n=1-4$, and $R_2$ is any of $CH_3-$ or $CF_3-$.

In the RTV anti-contamination flashover coating material provided by the present invention, preferably, the reinforcing filler is fumed silica, precipitated silica, or the like.

In the RTV anti-contamination flashover coating material provided by the present invention, preferably, the catalyst is one or a combination of more than one selected from organotin compounds, organotin chelates, organotitanium compounds, organotitanium chelates, and the like.

In the RTV anti-contamination flashover coating material provided by the present invention, preferably, the pigment is any one of iron oxide red, an inert pigment, and the like.

In the RTV anti-contamination flashover coating material provided by the present invention, preferably, the crosslinking agent has the structure below:

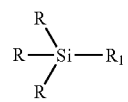

wherein, R is any one of acetoxy $CH_3COO-$, methoxy $CH_3O-$, a ketoximino group $MeEtCNO-$, an amide group $AcMeN-$, an amino group $C_6H_{11}NH-$ or an acetone group $H_2C=CMeO-$; and $R_1$ is any one of methyl $CH_3-$ or ethyl $CH_3CH_2-$.

In the RTV anti-contamination flashover coating material provided by the present invention, preferably, in the hydrophobic agent, in the mixture of the substance having a structure shown in Formula 1 with one or more of a low-molecular-weight silicone oil, dihydroxy(diphenyl)silane, a fluorine-containing silicone oil and white oil, the ratio by mass of the substance represented by Formula 1 to the other components is 1:1 to 1:4 (preferably 1:1 to 1:2).

The present invention further provides a production process for the above mentioned RTV anti-contamination flashover coating material, which includes the steps of adding polydimethylsiloxane, a reinforcing filler, a pigment and a hydrophobic agent into a planetary mixer, heating to 110-130° C. and mixing for 2-4 hours, followed by vacuum pumping for 2-3 hours (to decrease the vacuum degree below −0.09 MPa), then adding a crosslinking agent and mixing again, followed by further vacuum pumping for 0.5 hours (to decrease the vacuum degree below −0.09 MPa), adding a catalyst, decabromodiphenyl ether, and toluene as a solvent for dilution, and then taking out the product and packing it hermetically, so as to afford the RTV anti-contamination flashover coating material.

In the present invention, comparative tests may be carried out according to the steps included in the above described production process, except that the hydrophobic agent can be changed or omitted depending on different tests.

The RTV anti-contamination flashover coating material according to the present invention has the following beneficial effects over the prior art.

1). As demonstrated in a curing test, a performance test, and a hydrophobicity transfer aging test, the mechanical property, electrical property, hydrophobicity, loss and recovery of hydrophobicity, hydrophobicity transfer property and the like of the coating layer made from the RTV anti-contamination flashover coating material according to the present invention all meet the current industrial standards.

2). The hydrophobic agent in the RTV anti-contamination flashover coating material according to the present invention is bonded within the vulcanized coating layer of the RTV coating material via a temporary chemical bond during the preparation, and can be released through breakage of the temporary chemical bond under the influence of environmental factors during use, where the release rate of the hydrophobic agent is controlled and decreased through chemical forces by the specific controlled-release mechanism below:

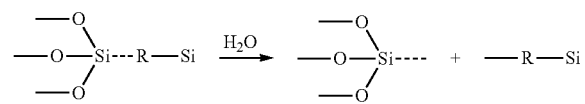

wherein, the dashed line represents a dissociable chemical bond, including ester bond, a Schiff-base group, and the like.

DETAILED DESCRIPTION OF THE INVENTION

Example 1

This example provides an RTV anti-contamination flashover coating material comprising the following components:

100 kg polydimethylsiloxane, 4 kg fumed silica, 0.1 kg dibutyltin dilaurate, 1 kg crosslinking agent, 3 kg hydrophobic agent, 1 kg iron oxide red, 1 kg decabromodiphenyl ether, and 30 kg toluene.

Among them, the crosslinking agent has the structure below:

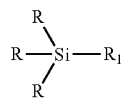

wherein, R is acetoxy $CH_3COO-$; and $R_1$ is methyl $CH_3-$.

The above-mentioned hydrophobic agent is a mixture obtained by mixing a substance having a structure shown below and a low-molecular-weight silicone oil at a weight ratio of 1:1,

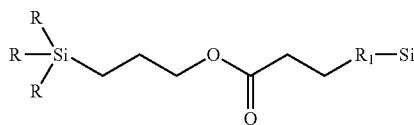

wherein, R is acetoxy $CH_3COO-$, $R^1-Si$ is a polysiloxane group or a fluorine-containing siloxane group having the structure below:

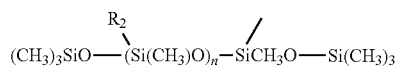

wherein, n=1, and $R_2$ is $CH_3-$.

Example 2

This example provides an RTV anti-contamination flashover coating material comprising the following components:

100 kg polydimethylsiloxane, 5 kg precipitated silica, 0.3 kg dibutyl dioctyl tin, 2 kg crosslinking agent, 4 kg hydrophobic agent, 1.5 kg iron oxide red, 1.5 kg decabromodiphenyl ether, and 35 kg toluene.

Among them, the crosslinking agent has the structure below:

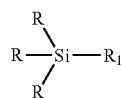

wherein, R is methoxy $CH_3O-$; and $R_1$ is ethyl $CH_3CH_2-$.

The above-mentioned hydrophobic agent is a mixture obtained by mixing a substance having a structure shown below and dihydroxy(diphenyl)silane at a weight ratio of 1:1.5,

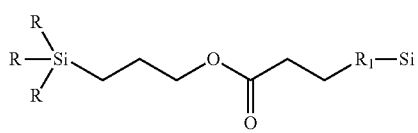

wherein, R is methoxy $CH_3O-$; and $R^1-Si$ is a polysiloxane group or a fluorine-containing siloxane group having the structure below:

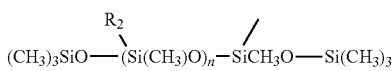

wherein, n=2, and $R_2$ is $CF_3$—.

Example 3

This example provides an RTV anti-contamination flashover coating material comprising the following components:

100 kg polydimethylsiloxane, 6 kg fumed silica, 0.5 kg dibutyltin bis(acetylacetonate) chelate, 3 kg crosslinking agent, 5 kg hydrophobic agent, 2 kg iron oxide red, 2 kg decabromodiphenyl ether, and 38 kg toluene.

Among them, the crosslinking agent has the structure below:

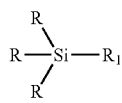

wherein, R is a ketoximino group MeEtCNO—; and $R_1$ is ethyl $CH_3CH_2$—.

The above-mentioned hydrophobic agent is a mixture obtained by mixing a substance having a structure shown below and a fluorine-containing silicone oil at a weight ratio of 1:2,

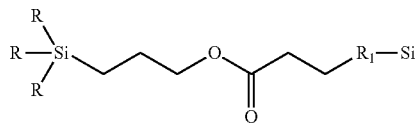

wherein, R is a ketoximino group MeEtCNO—; and $R^1$—Si is a polysiloxane group or a fluorine-containing siloxane group having the structure below:

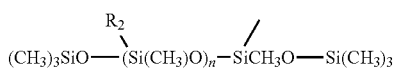

wherein, n=3, and $R_2$ is $CH_3$—.

Example 4

This example provides an RTV anti-contamination flashover coating material comprising the following components:

100 kg polydimethylsiloxane, 7 kg precipitated silica, 0.7 kg n-butyl titanate, 4 kg crosslinking agent, 6 kg hydrophobic agent, 1.2 kg iron oxide red, 1.2 kg decabromodiphenyl ether, and 40 kg toluene.

Among them, the crosslinking agent has the structure below:

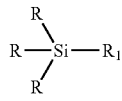

wherein, R is an amide group AcMeN—; and $R_1$ is ethyl $CH_3CH_2$—.

The above mentioned hydrophobic agent is a mixture obtained by mixing a substance having a structure shown below and white oil at a weight ratio of 1:3,

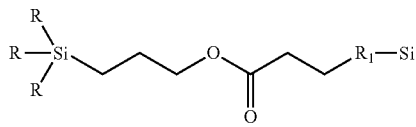

wherein, R is an amide group AcMeN—; and $R^1$—Si is a polysiloxane group or a fluorine-containing siloxane group having the structure below:

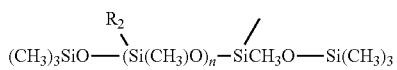

wherein, n=4, and $R_2$ is $CF_3$—.

Example 5

This example provides an RTV anti-contamination flashover coating material comprising the following components:

100 kg polydimethylsiloxane, 8 kg fumed silica, 1 kg dipropoxy titanium bis(acetylacetonate) chelate, 5 kg crosslinking agent, 6 kg hydrophobic agent, 2 kg iron oxide red, 1.4 kg decabromodiphenyl ether, and 36 kg toluene.

Among them, the crosslinking agent has the structure below:

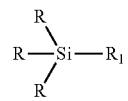

wherein, R is an amino group $C_6H_{11}NH$—; and $R_1$ is methyl $CH_3$—.

The above-mentioned hydrophobic agent is a mixture obtained by mixing a substance having a structure shown below, a low-molecular-weight silicone oil, and dihydroxy (diphenyl)silane at a weight ratio of 1:1:1,

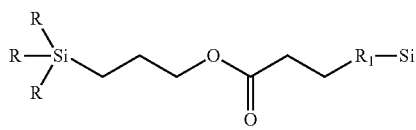

wherein, R is an amino group $C_6H_{11}NH$—; and $R^1$—Si is a polysiloxane group or a fluorine-containing siloxane group having the structure below:

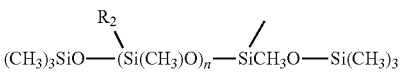

wherein, n=1, and $R_2$ is $CH_3$—.

Example 6

This example provides an RTV anti-contamination flashover coating material comprising the following components:

100 kg polydimethylsiloxane, 10 kg precipitated silica 10, 0.8 kg dibutyl dioctyl tin, 4 kg crosslinking agent, 5 kg hydrophobic agent, 1.6 kg iron oxide red, 1.8 kg decabromodiphenyl ether, and 40 kg toluene.

Among them, the crosslinking agent has the structure below:

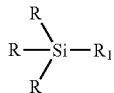

wherein, R is an acetone group $H_2C=CMeO-$; and $R_1$ is methyl $CH_3-$.

The above mentioned hydrophobic agent is a mixture obtained by mixing a substance having a structure shown below, a low-molecular-weight silicone oil, dihydroxy (diphenyl)silane, and a fluorine-containing silicone oil at a weight ratio of 1:1:2:1,

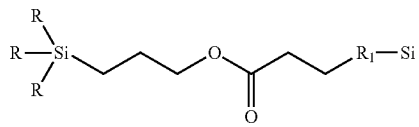

wherein, R is an acetone group $H_2C=CMeO-$; and $R^1-Si$ is a polysiloxane group or a fluorine-containing siloxane group having the structure below:

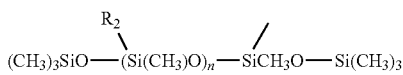

wherein, n=3, and $R_2$ is $CH_3-$.

All of the RTV anti-contamination flashover coating materials provided in Examples 1-5 can be prepared by the production process provided by the present invention.

To further demonstrate the effects of the RTV anti-contamination flashover coating materials according to the present invention, five comparative tests were performed on an RTV anti-contamination flashover coating material without hydrophobic agents added, an RTV anti-contamination flashover coating material with a commercially available hydrophobic agent added, and RTV anti-contamination flashover coating materials with hydrophobic agents of the present invention added in different amounts.

Comparative Test 1 (Without Hydrophobic Agents Added)

The components of the coating material according to Comparative Test 1 include:

100 kg polydimethylsiloxane, 4 kg fumed silica, 0.1 kg dibutyltin dilaurate, 1 kg crosslinking agent, 1 kg iron oxide red, 1.5 kg decabromodiphenyl ether, and 30 kg toluene;

Among them, the crosslinking agent has the structure below:

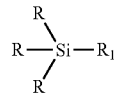

where R is acetoxy $CH_3COO-$; and $R_1$ is methyl $CH_3-$.

Curing Test—The RTV anti-contamination flashover coating material according to this comparative test was poured into a polytetrafluoroethylene mould (with a trough depth of 2 mm), and spread flat. The mould was put into a chamber of a constant temperature and constant humidity to allow vulcanization, where the temperature for vulcanization was 25° C. and the relative humidity for vulcanization was 50%. During the vulcanization, the tack-free time and the complete-curing time of the coating material were observed and recorded, and the thickness after vulcanization was 1.5 mm. As a result, the tack-free time is 45 min (≤45 min), and the complete-curing time is 24 h (<72 h), where the values in the parentheses are standard requirements. These results show that both indexes measured in the test meet the requirements.

Performance Test—After vulcanization of the sample, a test sheet was obtained, and was tested for the appearance, electrical property, mechanical property, and hydrophobicity (including hydrophobicity, loss and recovery of hydrophobicity, and hydrophobicity transfer) according to the Standard DL/T627-2004. The results are given below, and the values in the parentheses are standard requirements:

the appearance—the coating film obtained after the curing of the RTV coating material has a flat and smooth appearance without bubbles, peelings, or cracks;

the tear strength is 8.21 kN/m (>3 kN/m), and the shear strength is 2 MPa (>0.8 MPa);

the dielectric strength is 21.26 kV/mm (>18 kV/mm);

the HC level for hydrophobicity is HC1 (HC1-HC2); the HC level for loss of hydrophobicity is HC4-HC5 (HC1-HC2), and the hydrophobicity is difficult to recover; the HC level for hydrophobicity transfer is HC4-HC5 (HC2-HC3).

The above test results show that all indexes of the coating material measured in the test meet the requirements.

There is no general standard for a hydrophobicity transfer aging experiment, while this experiment is crucial to the evaluation of the service life of RTV coating materials. Here a hydrophobicity transfer aging experiment was carried out in this test in which the experiment was accelerated by an artificially-increased temperature and hydrophobicity transfer aging was repeated several times. The transfer rate of hydrophobicity transfer agent was estimated by using the number of the hydrophobicity transfer aging experiments conducted and the time needed to recover the HC level in each experiment.

Test Procedure—According to the operation process for hydrophobicity transfer test, on a test sheet diatomite was uniformly coated at a non-soluble deposit density (NSDD) of 1.0 mg/cm², left at a constant temperature of 80° C. for 2 h, and then tested for its surface hydrophobicity and the HC level by a spray method. If it was difficult for the hydrophobicity to recover in 2 h, then the test period was prolonged until the HC level was finally recovered to HC1-HC2, but the period was not prolonged to over 8 h; each time when the hydrophobicity recovered, the test sheet was taken out, washed to remove the diatomite on its surface, air-dried, and then coated again with diatomite. The above test procedure was repeated until the hydrophobicity of the test sheet was difficult to recover (back to HC1-HC2) in 8 h. The number of tests was recorded as the final test number, and the time needed for recovery in each test was also recorded.

As indicated by the results, the test sheet of this comparative test did not display any hydrophobicity transfer property; the number of hydrophobicity transfer aging tests is 0, and the time for recovery is infinite.

Comparative Test 2 (With a Commercially Available Hydrophobic Agent)

The components of the coating material according to this comparative test further include 3 kg low-molecular-weight silicone oil (with a viscosity of 20-100 cp) as the hydrophobic agent, in addition to the components of the coating material according to Comparative Test 1.

The curing test, the performance test, and the hydrophobicity transfer aging test were performed under the same procedure and the same conditions as those in Comparative Test 1, and the results are as follows:

Curing test results: the tack-free time is 45 min (≤45 min), the complete-curing time is 24 h (<72 h), and the results show that both indexes meet the requirements.

Performance Test Results:

the appearance—the coating film obtained after the curing of the RTV Coating material has a flat and smooth appearance without bubbles, peelings, or cracks;

the tear strength is 8.21 kN/m (>3 kN/m), and the shear strength is 2 MPa (>0.8 MPa);

the dielectric strength is 21.26 kV/mm (>18 kV/mm);

the HC level for hydrophobicity is HC1 (HC1-HC2); the HC level for loss of hydrophobicity is HC1-HC2 (HC1-HC2), and the hydrophobicity is difficult to recover; the HC level for hydrophobicity transfer is HC1-HC2 (HC2-HC3); and these results show that all indexes measured in the experiments meet the requirements;

The hydrophobicity transfer aging test results: the number of hydrophobicity transfer aging tests is 5, and the time for recovery is 2.5 hours.

As indicated by the results, the coating material of this comparative test displays some hydrophobicity transfer property.

Comparative Test 3

The components of the coating material according to this comparative test further include 3 kg hydrophobic agent having the structure below, in addition to the components of the coating material according to Comparative Test 1,

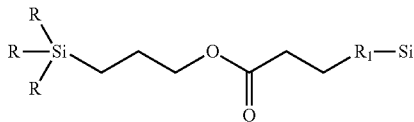

wherein, R is acetoxy $CH_3COO$—; and $R^1$—Si is

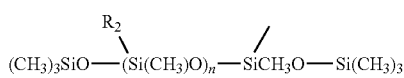

wherein, n=1, and $R_2$ is $CH_3$—.

The curing test, the performance test, and the hydrophobicity transfer aging test were performed under the same procedure and the same conditions as those in Comparative Test 1, and the results are as follows:

Curing test results: the tack-free time is 45 min (≤45 min), the complete-curing time is 24 h (<72 h), and the results show that both indexes meet the requirements.

Performance Test Results:

the appearance—the coating film obtained after the curing of the RTV Coating material has a flat and smooth appearance without bubbles, peelings, or cracks;

the HC level for hydrophobicity is HC1 (HC1-HC2); the HC level for loss of hydrophobicity is HC1-HC2 (HC1-HC2), and the hydrophobicity is difficult to recover; the HC level for hydrophobicity transfer is HC1-HC2 (HC2-HC3);

the tear strength is 8.21 kN/m (>3 kN/m), and the shear strength is 2 MPa (>0.8 MPa); the dielectric strength is 21.26 kV/mm (>18 kV/mm);

The hydrophobicity transfer aging test results: the number of hydrophobicity transfer aging tests is 3, and the time for recovery is infinite.

As indicated by the results, the coating material of this comparative test did not display a hydrophobicity transfer property, indicating that, although the addition of the hydrophobic agent might endow the coating layer with some hydrophobicity transfer property, the transfer rate was low.

Comparative Test 4

The components of the coating material according to this comparative test further include 1.5 kg low-molecular-weight methyl silicone oil (with a viscosity of 20-100 cp) and 1.5 kg hydrophobic agent having the structure below, in addition to the components of the coating material according to Comparative Test 1,

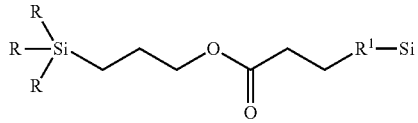

wherein, R is acetoxy $CH_3COO$—; and $R^1$—Si is

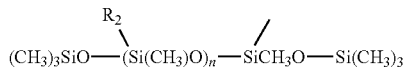

wherein, n=1, and $R_2$ is $CH_3$—.

The curing test, the performance test, and the hydrophobicity transfer aging test were performed under the same procedure and the same conditions as those in Comparative Test 1, and the results are as follows:

Curing test results: the tack-free time is 45 min (≤45 min), the complete-curing time is 24 h (<72 h), and the results show that both indexes meet the requirements.

Performance Test Results:

the appearance—the coating film obtained after the curing of the RTV Coating material has a flat and smooth appearance without bubbles, peelings, or cracks;

the tear strength is 9.05 kN/m (>3 kN/m), and the shear strength is 2 MPa (>0.8 MPa); the dielectric strength is 19.35 kV/mm (>18 kV/mm);

the HC level for hydrophobicity is HC1 (HC1-HC2); the HC level for loss of hydrophobicity is HC1-HC2 (HC1-HC2), the time for recovery is 12 h (<24 h), the HC level for hydrophobicity transfer is HC2-HC3 (HC2-HC3), and the results show that all indexes meet the requirements.

The hydrophobicity transfer ageing test results: the number of hydrophobicity transfer aging tests is 9, and the time for recovery is 10 hours.

As indicated by the results, this comparative test shows a good hydrophobicity transfer property and hydrophobicity transfer aging performance, in comparison with comparative group 3.

Comparative Test 5

The components of the coating material according to this comparative test further include 0.75 kg low-molecular-weight methyl silicone oil (with a viscosity of 20-100 cp), 0.75 kg diphenyl dihydroxy silane and 1.5 kg hydrophobic agent having the structure below, in addition to the components of the coating material according to Comparative Test 1.

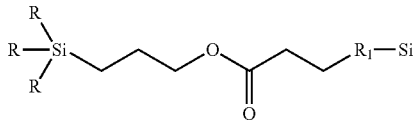

wherein, R is acetoxy $CH_3COO$—; and $R^1$—Si is

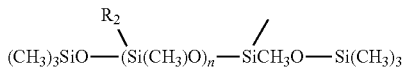

wherein, n=1, and $R_2$ is $CH_3$—.

The curing test, the performance test, and the hydrophobicity transfer aging test were performed under the same procedure and the same conditions as those in Comparative Test 1, and the results are as follows:

Curing test results: the tack-free time is 45 min (≤45 min), the complete-curing time is 24 h (<72 h), and the results show that both indexes meet the requirements.

Performance Test Results:

the appearance—the coating film obtained after the curing of the RTV Coating material has a flat and smooth appearance without bubbles, peelings or cracks, and has good chemical-resisting performance;

the tear strength is 10.45 kN/m (>3 kN/m), and the shear strength is 2 MPa (>0.8 MPa); the dielectric strength is 19.58 kV/mm (>18 kV/mm);

the HC level for hydrophobicity is HC1 (HC1-HC2); the HC level for loss of hydrophobicity is HC1-HC2 (HC1-HC2), the time for recovery is 12 h (<24 h), the HC level for hydrophobicity transfer is HC1-HC2 (HC2-HC3), and the results show that all indexes meet the requirements.

The hydrophobicity transfer aging test results: the number of hydrophobicity transfer ageing tests is 12, and the time for recovery is 4.5 hours.

As indicated by the results, in comparison with the coating materials of Comparative Tests 1-4, the coating material of this comparative test displays a higher hydrophobicity transfer rate and a larger number of transfers, indicating that the RTV anti-contamination flashover coating material formulated with a low-molecular-weight silicone oil and dihydroxy(diphenyl)silane in combination shows the best performance, which is better than that of the coating material using a long-acting hydrophobic agent alone or using a common commercially available hydrophobic agent.

The invention claimed is:

1. An RTV anti-contamination flashover coating material comprising the following components in parts by weight:
   a) 100 parts of polydimethylsiloxane,
   b) 4-10 parts of reinforcing filler,
   c) 0.1-1 parts of catalyst,
   d) 1-5 parts of crosslinking agent,
   e) 3-6 parts of hydrophobic agent,
   f) 1-2 parts of pigment,
   g) 1-2 parts of decabromodiphenyl ether, and 30-40 parts of toluene;

wherein, the hydrophobic agent is a mixture of
   (i) a substance having a structure shown in Formula 1,

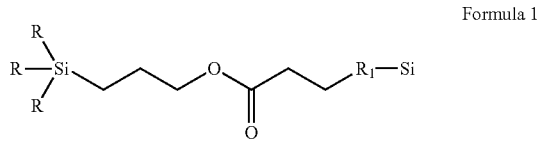

Formula 1 and
   (ii) one or more of a low-molecular-weight silicone oil, dihydroxy(diphenyl)silane, a fluorine-containing silicone oil, and white oil: wherein,
      a) R is any one of acetoxy $CH_3COO$—, methoxy $CH_3O$—, a ketoximino group MeEtCNO—, an amide group AcMeN—, an amino group $C_6H_{11}NH$—, and an acetonyl group $H_2C=CMeO$—; and
      b) R1-Si is a polysiloxane group or a fluorine-containing siloxane group, and has a structure shown in Formula 2:

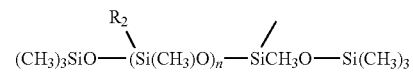

Formula 2 wherein, n=1-4, and $R_2$ is any one of $CH_3$— or $CF_3$—.

2. The RTV anti-contamination flashover coating material according to claim 1, wherein the reinforcing filler is fumed silica or precipitated silica.

3. The RTV anti-contamination flashover coating material according to claim 1, wherein the catalyst is one or a combination of more than one selected from organotin compounds, organotin chelates, organotitanium compounds, and organotitanium chelates.

4. The RTV anti-contamination flashover coating material according to claim 1, wherein the pigment is any one of iron oxide red or an inert pigment.

5. The RTV anti-contamination flashover coating material according to claim 1, wherein the crosslinking agent has the structure below:

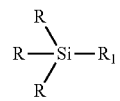

wherein, R is any one of acetoxy $CH_3COO$—, methoxy $CH_3O$—, a ketoximino group MeEtCNO—, an amide group AcMeN—, an amino group $C_6H_{11}NH$— or an acetonyl group $H_2C=CMeO$—; and $R_1$ is any one of methyl $CH_3$— or ethyl $CH_3CH_2$—.

6. The RTV anti-contamination flashover coating material according to claim 1, wherein, in the hydrophobic agent (e), comprises the compound of Formula I mixed with one or more of:
   i) a low-molecular-weight silicone oil,
   ii) dihydroxy(diphenyl)silane,
   iii) a fluorine-containing silicone oil, and
   iv) a white oil, wherein the ratio by mass of the compound of Formula 1 to said one or more components: i, ii, iii, and iv, is 1:1 to 1:4.

7. A process for producing the RTV anti-contamination flashover coating material according to claim 1, comprising the following steps:
   a) adding the following agents to a planetary mixer: polydimethylsiloxane, a reinforcing filler, a pigment and a hydrophobic agent,
   b) heating said agents in the planetary mixer to 110-130° C. and mixing for 2-4 hours,
   c) vacuum pumping the heated agents for 2-3 hours,
   d) adding a crosslinking agent to the vacuumed heated agents, and mixing again, followed by further vacuum pumping for 0.5 hours,
   e) adding to said mixture of agents, a catalyst, decabromodiphenyl ether, and toluene as a solvent for dilution, and
   f) removing the RTV anti-contamination flashover coating material.

* * * * *